(12) United States Patent
Sugihara et al.

(10) Patent No.: US 9,726,892 B2
(45) Date of Patent: Aug. 8, 2017

(54) LIGHT GUIDE PRISM AND IMAGE DISPLAY APPARATUS

(71) Applicant: OLYMPUS CORPORATION, Tokyo (JP)

(72) Inventors: Ryohei Sugihara, Tokyo (JP); Shinya Takahashi, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 0 days.

(21) Appl. No.: 15/138,652

(22) Filed: Apr. 26, 2016

(65) Prior Publication Data

US 2016/0238846 A1 Aug. 18, 2016

Related U.S. Application Data

(63) Continuation of application No. PCT/JP2013/006352, filed on Oct. 28, 2013.

(51) Int. Cl.
*G02B 27/01* (2006.01)
*G02B 5/04* (2006.01)
*G02B 17/08* (2006.01)

(52) U.S. Cl.
CPC .......... *G02B 27/0172* (2013.01); *G02B 5/04* (2013.01); *G02B 17/086* (2013.01); *G02B 27/01* (2013.01);
(Continued)

(58) Field of Classification Search
CPC .. G02B 27/017; G02B 27/0172; G02B 27/01; G02B 27/0101; G02B 2027/012; G02B 2027/0178; G02B 5/04
(Continued)

(56) References Cited

U.S. PATENT DOCUMENTS 6,715,880 B2 * 4/2004 Shouji ............. H04N 9/3152
348/744
2007/0031106 A1 * 2/2007 Yamashita .......... G02B 6/0011
385/146
(Continued)

FOREIGN PATENT DOCUMENTS

CN 102255227 A 11/2011
JP 2007-286317 A 11/2007
(Continued)

OTHER PUBLICATIONS

International Search Report dated Dec. 3, 2013 issued in PCT/JP2013/006352.
(Continued)

*Primary Examiner* — William R Alexander
(74) *Attorney, Agent, or Firm* — Scully, Scott, Murphy & Presser, P.C.

(57) ABSTRACT

A light guide prism for guiding image light from a display device to an observer's eye and displaying a virtual image of the display device in the observer's field of view includes at least four sides disposed to surround an optical path of image light incident from one end, a reflecting surface configured to reflect the image light guided by the at least four sides, and an emission surface configured to emit the image light reflected at the reflecting surface towards the observer's eye. At least one groove in a V-shape is formed on each of the at least four sides. As a result, a light guide prism that reduces stray light and ghost light occurring due to reflection at inner surfaces and an image display apparatus using this light guide prism can be provided.

10 Claims, 9 Drawing Sheets

(52) U.S. Cl.
CPC .................. *G02B 2027/012* (2013.01); *G02B 2027/0178* (2013.01)

(58) Field of Classification Search
USPC .............................. 359/833, 831; 345/7, 8, 9
See application file for complete search history.

(56) References Cited

U.S. PATENT DOCUMENTS

| | | | |
|---|---|---|---|
| 2010/0214659 A1 | 8/2010 | Levola | |
| 2010/0277803 A1 | 11/2010 | Pockett et al. | |
| 2010/0321781 A1 | 12/2010 | Levola et al. | |
| 2012/0242561 A1* | 9/2012 | Sugihara | G02B 27/0172 345/8 |
| 2012/0320100 A1* | 12/2012 | Machida | G02B 27/017 345/690 |
| 2014/0139403 A1* | 5/2014 | Hiraide | G02B 27/0172 345/8 |
| 2014/0139927 A1* | 5/2014 | Hiraide | G02B 27/0172 359/630 |
| 2016/0245984 A1* | 8/2016 | Yu | G02B 6/00 |

FOREIGN PATENT DOCUMENTS

| | | |
|---|---|---|
| JP | 2011-509417 A | 3/2011 |
| JP | 2014-085426 A | 5/2014 |

OTHER PUBLICATIONS

Chinese Office Action dated Aug. 25, 2016 received in CN 201380080298.5.
Chinese Office Action dated Feb. 13, 2017 in Chinese Patent Application No. 201380080298.5.

* cited by examiner

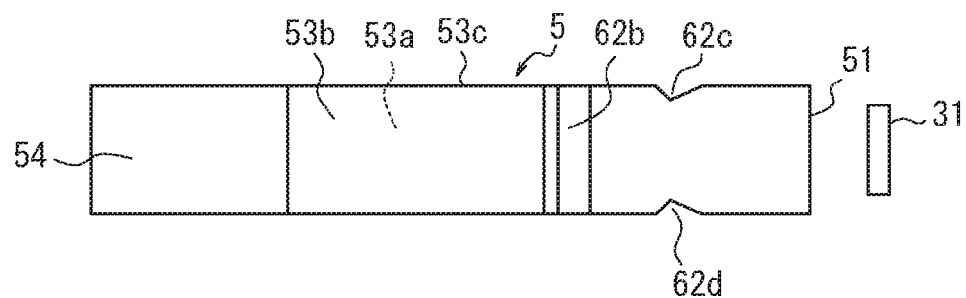
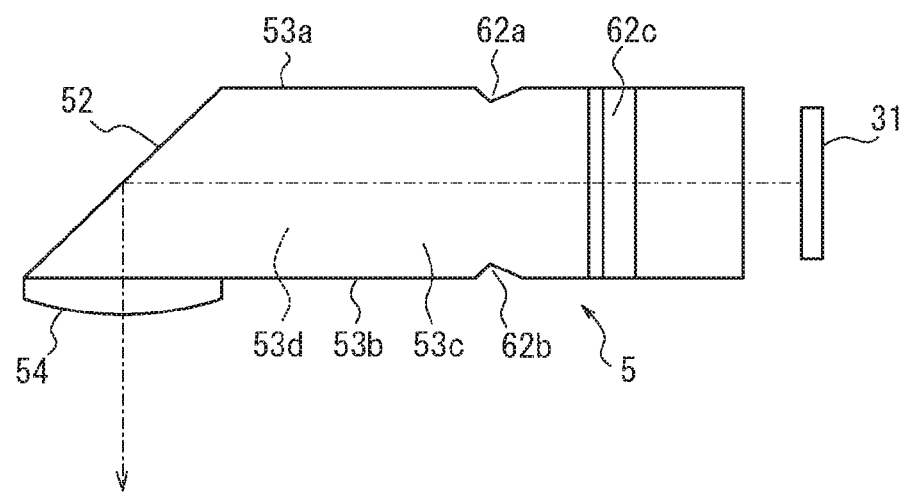
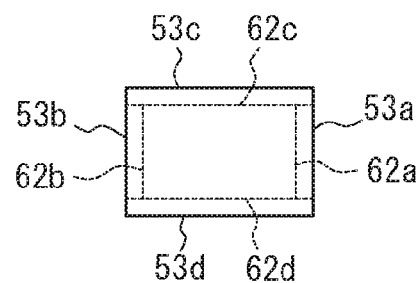

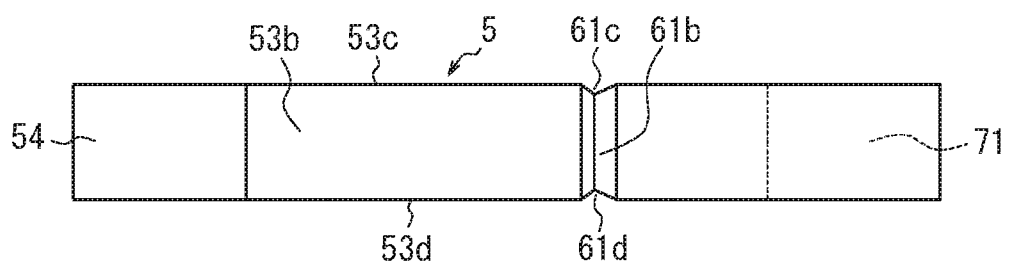
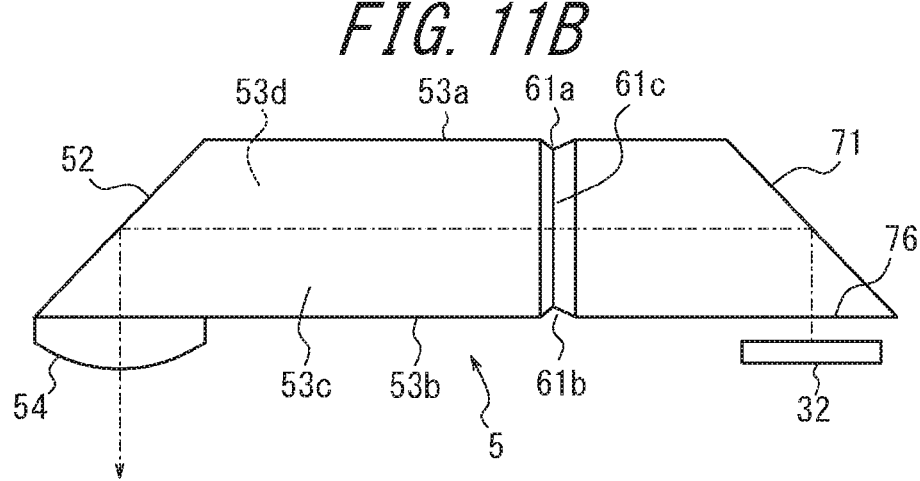

LIGHT GUIDE PRISM AND IMAGE DISPLAY APPARATUS

CROSS-REFERENCE TO RELATED APPLICATION

The present application is a Continuing Application based on International Application PCT/JP2013/006352 filed on Oct. 28, 2013, the entire disclosure of which is incorporated herein by reference.

TECHNICAL FIELD

This disclosure relates to a light guide prism that guides image light from a display device and displays a virtual image of a display image within an observer's field of view. This disclosure also relates to an image display apparatus using the light guide prism.

BACKGROUND

In recent years, compact, wearable image display apparatuses that can be worn on the head or on eyeglasses have been proposed. For example, in one such known image display apparatus, image light of an image displayed on a small image display device secured to the temporal region is guided by a transparent light-guiding member to a position in front of the eye to display the image as an expanded virtual image in an observer's field of view (for example, see JP 2007-286317 A (PTL 1)). The small, lightweight light-guiding member does not greatly block the field of view, and the entire image display apparatus can be made small and lightweight, allowing use as a wearable device that can continually be worn on the body and used.

By reducing the light-guiding member in size, however, stray light and ghost light that are reflected at locations such as the inner surfaces of the light-guiding member tend to become pronounced. In particular, as the cross-sectional size of the light-guiding member is smaller, ghost light reflected at the sides of the light-guiding member is visible closer to the display image in the field of view. Therefore, in PTL 1, grooves are formed at different positions on two opposing sides of the transparent substrate at which image light is reflected, and unnecessary reflected light within the transparent substrate for light guiding is reflected and removed.

CITATION LIST

Patent Literature

PTL 1: JP 2007-286317 A

SUMMARY

A light guide prism according to an aspect of this disclosure is a light guide prism for guiding image light from a display device to an observer's eye and displaying a virtual image of the display device in the observer's field of view, the light guide prism including:

at least four sides disposed to surround an optical path of image light incident from one end;

a reflecting surface configured to reflect the image light guided by the at least four sides; and an emission surface configured to emit the image light reflected at the reflecting surface towards the observer's eye, such that at least one groove in a V-shape is formed on each of the at least four sides.

The at least one groove is preferably formed to traverse the at least four sides and surround an optical path of the image light.

Alternatively, the at least four sides may be formed by two pairs of two opposing sides, the at least one groove may include a first pair of grooves and a second pair of grooves each formed at opposing positions on two opposing sides, and the first pair of grooves and the second pair of grooves may be disposed at a distance from each other in a direction of travel of the image light.

The above-described structure more preferably further includes a third pair of grooves, on the side on which the first pair of grooves is formed, at a different position in the direction of travel of the image light from the first pair of grooves, such that an angle of an inclined face forming the V-shape of the first pair of grooves differs from an angle of an inclined face of the third pair of grooves.

An image display apparatus according to an aspect of this disclosure includes:

a display device configured to emit image light;

a light guide prism configured to guide image light from the display device to an observer's eye and display a virtual image of the display device in the observer's field of view, the light guide prism including at least four sides disposed to surround an optical path of image light incident from one end, a reflecting surface configured to reflect the image light guided by the at least four sides, and an emission surface configured to emit the image light reflected at the reflecting surface towards the observer's eye, a groove in a V-shape being formed on each of the at least four sides; and a support configured to support and secure the display device and the light guide prism to the observer's head.

The relationship $Dw<Vw<Pw$ is preferably satisfied, where $Pw$ is a width of one side among the at least four sides, $Vw$ is a length, in a direction of the width of the one side, of the groove formed on the one side, and $Dw$ is a width of an effective region of the display device, in the direction of width of the one side.

The $D\theta<V\theta<P\theta$ is preferably satisfied, where $D\theta$ is a viewing angle of the display region of the display device, $V\theta$ is a viewing angle of a region formed by connecting edges of the V-shape of the grooves, and $P\theta$ is a viewing angle of an entrance surface, through which the image light from the display device is incident, of the light guide prism.

A light guide prism according to an aspect of this disclosure is a light guide prism for guiding image light from a display device to an observer's eye and displaying a virtual image of the display device in the observer's field of view, the light guide prism including:

at least four sides disposed to surround an optical path of image light incident from one end;

a reflecting surface configured to reflect the image light guided by the at least four sides; and an emission surface configured to emit the image light reflected at the reflecting surface towards the observer's eye, such that an opposing pair of grooves in a V-shape is formed on at least one opposing pair of sides among the at least four sides.

The above-described structure preferably further includes another pair of grooves in a V-shape, on the sides on which the pair of grooves in a V-shape is formed, towards the emission surface from the pair of grooves in a V-shape in a direction of travel of the image light, and the relationship $Vb\theta<Va'\theta$ is preferably satisfied, where $Va'\theta$ is a viewing angle defined by a width between positions symmetrical, about the sides on which the pair of grooves in a V-shape is formed, with edges of the pair of grooves in a V-shape, and $Vb\theta$ is a viewing angle defined by a width between the other pair of grooves in a V-shape.

An image display apparatus according to an aspect of this disclosure includes:

a display device configured to emit image light;

a light guide prism configured to guide image light from the display device to an observer's eye and display a virtual image of the display device in the observer's field of view, the light guide prism including at least four sides disposed to surround an optical path of image light incident from one end, a reflecting surface configured to reflect the image light guided by the at least four sides, and an emission surface configured to emit the image light reflected at the reflecting surface towards the observer's eye, an opposing pair of grooves in a V-shape being formed on at least one opposing pair of sides among the at least four sides; and a support configured to support and secure the display device and the light guide prism to the observer's head.

BRIEF DESCRIPTION OF THE DRAWINGS

In the accompanying drawings:

FIG. 5A is a front view of the optical system in an image display apparatus of Embodiment 2 as seen from the eye, FIG. 5B is a plan view of the optical system in the image display apparatus of Embodiment 2, and FIG. 5C is a side view of the optical system in the image display apparatus of Embodiment 2 as seen from the display device side;

FIG. 11A is a front view of a modification to the entrance-side end of a light guide prism, and FIG. 11B is a plan view of the modification to the entrance-side end of the light guide prism.

DETAILED DESCRIPTION

The following describes embodiments with reference to the drawings.

Embodiment 1

Figure 1:
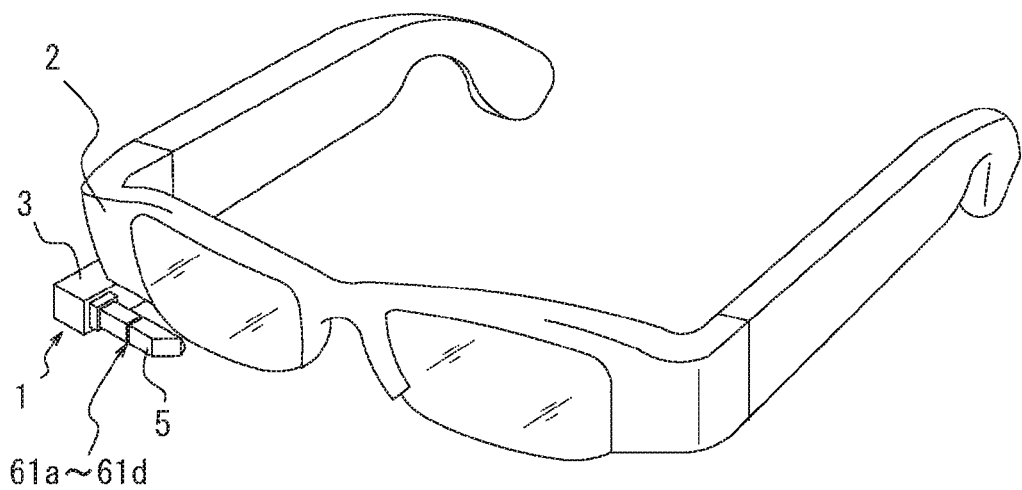
FIG. 1 is a perspective view illustrating the appearance of an image display apparatus according to Embodiment 1.

FIG. 1 is a perspective view illustrating the appearance of an image display apparatus according to Embodiment 1. The image display apparatus 1 includes a support 2, a body 3, and a light guide prism 5. The support 2 has the shape of eyeglasses and supports and secures the entire image display apparatus to the observer's head. The body 3 houses a display device 31 (see FIGS. 2A to 2C) secured to the temple (frame by the temporal region) of the support 2. The light guide prism 5 is supported at one end by the body 3, the other end extending before the observer's eye when worn.

In addition to the display device 31, an electrical circuit for displaying an image in the display device 31, a communication function for receiving video data from outside the body 3 by a wired or wireless connection, and the like are provided in the body 3.

Figure 2A:
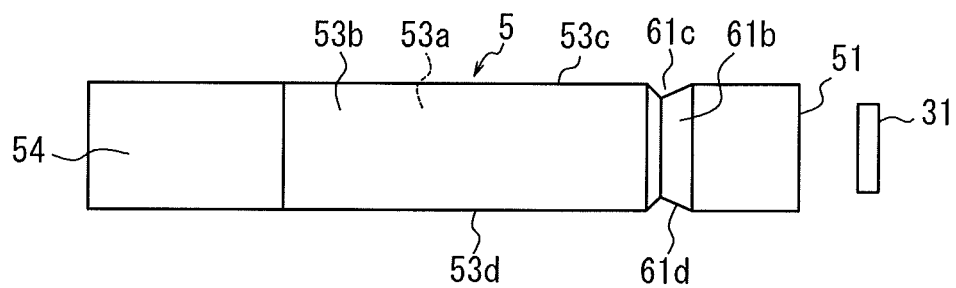
FIG. 2A is a front view of the optical system in the image display apparatus in FIG. 1 as seen from the eye.
Figure 2B:
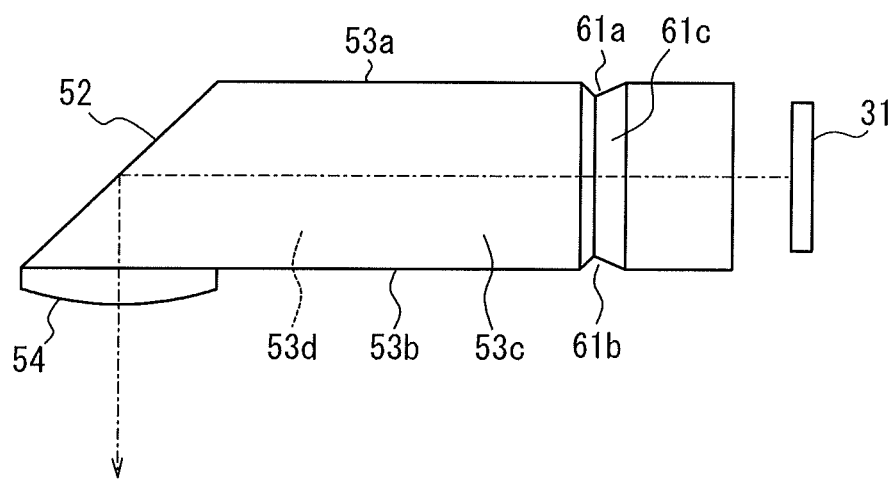
FIG. 2B is a plan view of the optical system in the image display apparatus in FIG. 1.
Figure 2C:
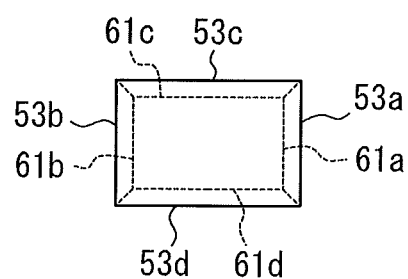
FIG. 2C is a side view of the optical system in the image display apparatus in FIG. 1 as seen from the display device side.

FIGS. 2A, 2B, and 2C illustrate the optical system in the image display apparatus in FIG. 1. FIG. 2A is a front view as seen from the eye, FIG. 2B is a plan view, and FIG. 2C is a side view as seen from the display device side. The display device 31 is a liquid crystal display device, an organic EL element, or the like, is housed in the body 3, and displays an image to be observed. The display device 31 is configured so that image light of an image displayed thereon is incident on an entrance surface 51 of the light guide prism 5. A protective window (not illustrated) for protecting the display device 31 is preferably provided between the display device 31 and the entrance surface 51 of the light guide prism 5.

The light guide prism 5 is a prism elongated in one direction and made of transparent resin. The light guide prism 5 is provided with an entrance surface 51 and a reflecting surface 52 at the ends in the longitudinal direction, which is the direction of travel of image light. Between the entrance surface 51 and the reflecting surface 52, the light guide prism 5 includes a first side 53a, a second side 53b, a third side 53c, and a fourth side 53d that surround the optical path of the image light, and an emission surface 54 is formed on the second side. When the observer wears the image display apparatus 1, the first side 53a is positioned on the opposite side from the side that faces the front of the observer, and the second side 53b is the side that faces the front of the observer. The third side 53c is the top side of the light guide prism, and the fourth side 53d is the bottom side of the light guide prism. In other words, the first side 53a and the second side 53b are opposite each other, and the third side 53c and the fourth side 53d are opposite each other.

In FIGS. 2A to 2C, the first to fourth sides 53a to 53d are formed as flat surfaces, each being roughly orthogonal to the entrance surface 51. The first to fourth sides 53a to 53d may, however, be somewhat curved, and the entrance surface 51 side may be configured to be wider than the reflecting surface 52 side. For example, the distance between the third side 53c and the fourth side 53d may be set to be narrower at the reflecting surface 52 side than at the entrance surface 51 side. The width of the first and second sides as seen from the observer's eye is suitably set to be narrower than 4 mm, which is the average human pupil diameter, so as not to obstruct observation of the outside world in front of the light guide prism 5. Alternatively, for larger display of an image in the field of view, the width may be approximately 4 mm to 9 mm.

The reflecting surface 52 is formed as an inclined surface with respect to the longitudinal direction of the light guide prism 5 by inclining the inner surface approximately 45° towards the observer. This reflecting surface 52 is formed as a mirror surface, for example by aluminum sputtering, so that image light travelling in the longitudinal direction is fully reflected in the light guide prism 5. Depending on conditions such as the refractive index of the material for the light guide prism 5 and the angle of the reflecting surface, the entire reflecting surface can be formed without coating the surface with a reflective film.

The emission surface 54 is provided on a portion of the second side 53b adjacent to the reflecting surface 52. The emission surface 54 is formed as a convex surface positioned along the optical path to the eye of image light reflected at the reflecting surface 52. The emission surface 54 is formed integrally with the light guide prism 5. Integral formation using resin allows the light guide prism 5 to be mass-produced inexpensively. The emission surface 54 may, however, also be formed by joining a plano-convex lens to the second side 53b formed as a flat surface. In the figures from FIG. 2B on, the optical axis of the emission surface 54 is illustrated as a dot-dash line. The optical axis bends at the reflecting surface 52 and passes through the center of the display device 31. Between the reflecting surface 52 and the entrance surface 51, the direction of the optical axis matches the longitudinal direction of the light guide prism 53.

On the first to fourth sides 53a to 53d of the light guide prism 5, respective prism grooves 61a to 61d with a V-shaped cross-section extend in a direction perpendicular to the longitudinal direction. The prism grooves 61a to 61d are each formed to connect with the prism grooves on the adjacent sides, thereby integrally traversing the four sides 53a to 53d of the light guide prism 5 so as to surround the optical path of the image light.

Figure 3:
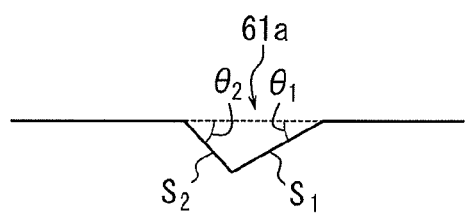
FIG. 3 is a cross-sectional diagram illustrating an expanded view of a prism groove provided on a first side in FIG. 1.

The prism grooves 61a to 61d are each formed by two groove faces sandwiching an edge that cuts into a side of the light guide prism 5. FIG. 3 is a cross-sectional diagram illustrating an expanded view of a prism groove 61a provided on the first side 53a in FIG. 2B. The prism groove 61a is formed by two groove faces $S_1$ and $S_2$. The inclination angles $\theta_1$ and $\theta_2$ of the groove faces $S_1$ and $S_2$ are designed to remove stray light and ghost light occurring in the light guide prism by transmitting such light to the outside of the light guide prism 5 or by reflecting such light towards the inside of the light guide prism for transmission through another side. Therefore, the entrance surface side and the emission surface side of the V-shaped cross section of each of the prism grooves 61a to 61d are not necessarily symmetrical. Note that undesirable light produced by reflection at an unintended position in the light guide prism is referred to as stray light. In particular, light that produces an undesirable image other than the proper image to be observed is referred to as ghost light.

Figure 4:
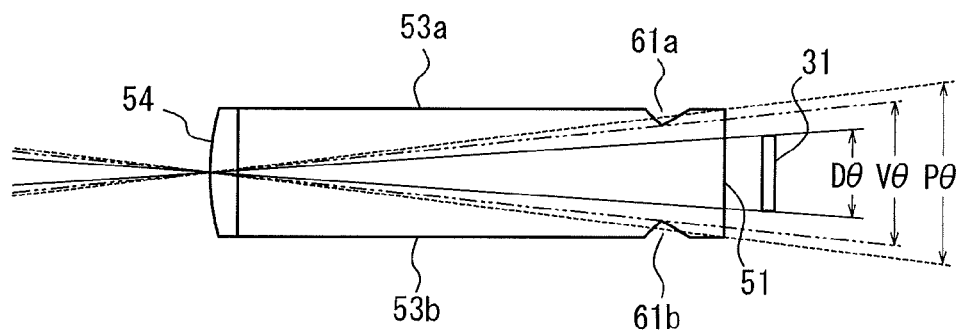
FIG. 4 illustrates the relationship between the viewing angles of the display device, a frame formed by the edges of the prism grooves, and the entrance window of the light guide prism in FIGS. 2A to 2C.

FIG. 4 illustrates the relationship between the viewing angles of the display device, a frame formed by the edges of the prism grooves, and the entrance window of the light guide prism in FIGS. 2A to 2C, schematically illustrating the optical system of FIG. 2B by linearly extending the bend due to the reflecting surface 52. In FIG. 4, Dθ, Vθ, and Pθ respectively indicate the viewing angle of the display region of the display device, the viewing angle of a region formed by connecting edges of the V-shaped prism grooves, and the viewing angle of the entrance window frame of the light guide prism. These viewing angles can be confirmed by drawing lines that connect the center of the emission surface 54 with the outer edges of each region. Dθ, Vθ, and Pθ are formed to satisfy the following relationship.

Dθ<Vθ<Pθ

Each viewing angle in the example in FIG. 4 is the viewing angle in the horizontal direction (a direction perpendicular to the first side 53a and the second side 53b). The light guide prism is preferably configured so that the viewing angles in the perpendicular direction also satisfy a similar relationship.

By being configured in this way, the image light emitted from the display device 31 of the body 3 passes through the entrance surface 51 of the light guide prism 5 and enters the light guide prism 5. The image light that enters the light guide prism 5 is guided through the light guide prism 5 in the longitudinal direction, is reflected by the reflecting surface 52, and exits towards the observer's eye from the emission surface 54. Since the emission surface 54 has a positive refractive power, from the observer's side, the image displayed on the display device 31 is displayed in the field of view as an enlarged virtual image.

When the prism grooves 61a to 61d are not provided, a portion of the image light emitted from the display device 31 may be reflected at an unintended position on the first to fourth sides 53a to 53d, which may cause stray light or ghost light. In the light guide prism 5 of this disclosure, however, the prism grooves 61a to 61d are formed on the first to fourth sides 53a to 53d respectively, allowing stray light and ghost light to be removed to outside the light guide prism 5, preventing a reduction in contrast, and preventing a ghost image from appearing around the display image. Furthermore, the prism grooves 61a to 61d are disposed on the first to fourth sides 53a to 53d to surround the optical path of the image light, thereby allowing more reliable removal of stray light and ghost light at this position in the longitudinal direction.

Furthermore, as illustrated in FIG. 4, when Dθ, Vθ, and Pθ are respectively the viewing angle of the display region of the display device, the viewing angle of a region formed by connecting edges of the V-shaped prism grooves, and the viewing angle of the entrance window frame of the light guide prism, then Dθ, Vθ, and Pθ satisfy the following relationship.

Dθ<Vθ<Pθ

Therefore, the image light from the display region of the display device 31 is not obstructed by the prism grooves 61a to 61d, and ghost light occurring at the sides between the prism grooves 61a to 61d and the entrance surface 51 can be cut.

As described above, according to this embodiment, respective V-shaped prism grooves 61a to 61d are formed on the four sides 53a to 53d of the light guide prism 5 that surround the optical path of the image light. Therefore, stray light and ghost light due to reflection at the inner surfaces of the light guide prism 5 can be reduced. Furthermore, since the prism grooves 61a to 61d are formed so as to surround the four sides 53a to 53d, stray light and ghost light can be cut more reliably. Also, obstruction of effective image light by the prism grooves can be prevented by satisfying the relationship Dθ<Vθ<Pθ.

Embodiment 2

FIGS. 5A, 5B, and 5C illustrate the optical system in the image display apparatus of Embodiment 2. FIG. 5A is a front view as seen from the eye, FIG. 5B is a plan view, and FIG. 5C is a side view as seen from the display device side. In the light guide prism 5 of Embodiment 2, instead of the prism grooves 61a to 61d in the light guide prism 5 of Embodiment 1 in FIG. 1, a pair of prism grooves 62a and 62b (first pair of grooves) provided on the first side 53a and the second side 53b is formed at opposing positions, and another pair of prism grooves 62c and 62d (second pair of grooves) provided on the third side 53c and the fourth side 53d is formed at opposing positions. The prism grooves 62a and 62b are disposed at a distance from the prism grooves 62c and 62d towards the reflecting surface 52 side in the longitudinal direction of the light guide prism 5. Since the remaining structure is similar to Embodiment 1, identical or corresponding constituent devices are labeled with the same reference signs, and a description thereof is omitted.

According to this embodiment, respective V-shaped prism grooves 62a to 62d are formed on the four sides 53a to 53d of the light guide prism 5 that surround the optical path of the image light. Therefore, stray light and ghost light due to reflection at the inner surfaces of the light guide prism 5 can be reduced, as in Embodiment 1. Furthermore, since the prism grooves 62a and 62b are displaced in the longitudinal direction from the prism grooves 62c and 62d, when forming the light guide prism 5 by resin molding, the resin flows well, and the accuracy of each optical surface of the first to fourth sides 53a to 53d can be improved.

Embodiment 3

Figure 6A:
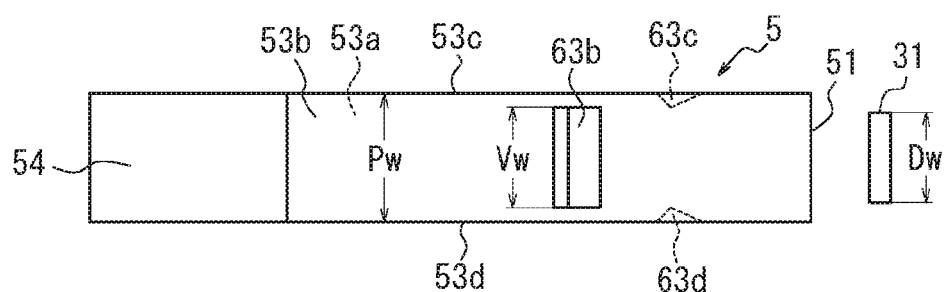
FIG. 6A is a front view of the optical system in an image display apparatus of Embodiment 3 as seen from the eye.
Figure 6B:
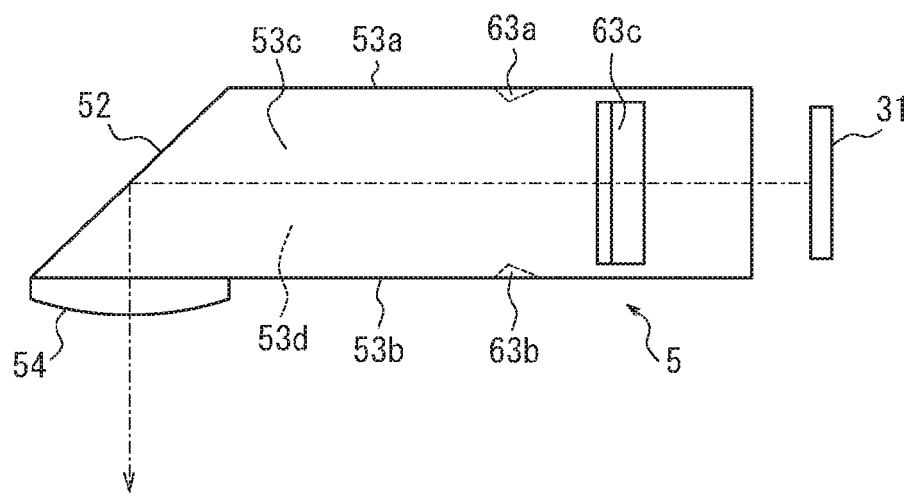
FIG. 6B is a plan view of the optical system in the image display apparatus of Embodiment 3.
Figure 6C:
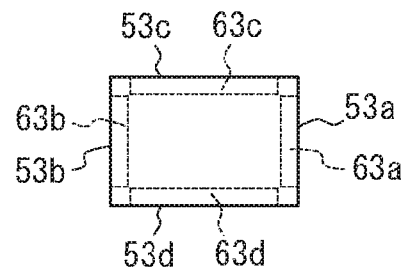
FIG. 6C is a side view of the optical system in the image display apparatus of Embodiment 3 as seen from the display device side.

FIGS. 6A, 6B, and 6C illustrate the optical system in the image display apparatus of Embodiment 3. FIG. 6A is a front view as seen from the eye, FIG. 6B is a plan view, and FIG. 6C is a side view as seen from the display device side. In the light guide prism 5 of Embodiment 3, instead of the prism grooves 62a to 62d that cut across each side of the light guide prism 5 of Embodiment 2 in FIGS. 5A to 5C, prism grooves 63a to 63d that are shorter than the width of the first to fourth sides 53a to 53d in a direction orthogonal to the longitudinal direction are formed on the first to fourth sides 53a to 53d. The prism grooves 63a to 63d are respectively formed within the first to fourth sides 53a to 53d, without extending to the corners between adjacent sides of the first to fourth sides 53a to 53d.

The light guide prism 5 is configured so as to satisfy the relationship

Dw<Vw<Pw where Pw is the width of any one of the sides of the light guide prism (for example, the second side 53b), Vw is the length of the prism groove formed on that side (prism groove 63b), and Dw is the width of the effective region of the display device in the direction corresponding to that side.

Since the remaining structure is similar to Embodiment 2, identical or corresponding constituent elements are labeled with the same reference signs, and a description thereof is omitted.

With the above-described structure, the length of the prism grooves 63a to 63d is greater than the effective diameter of the display device 31 in the corresponding direction. Therefore, ghost light can be cut out without exception. Furthermore, the length of the prism grooves 63a to 63d is less than the width of the corresponding sides 53a to 53d of the light guide prism 5, and no groove is provided at the corners between adjacent sides of the light guide prism 5. Therefore, the holding force when using the light guide prism 5 by attachment to the body 3 can be guaranteed.

When sliding the light guide prism 5 in the longitudinal direction with respect to the body 3 for diopter adjustment, the light guide prism 5 can also be slid smoothly.

Embodiment 4

Figure 7A:
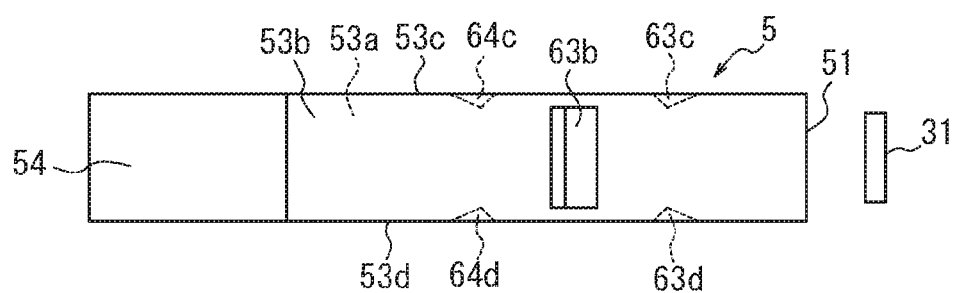
FIG. 7A is a front view of the optical system in an image display apparatus of Embodiment 4 as seen from the eye.
Figure 7B:
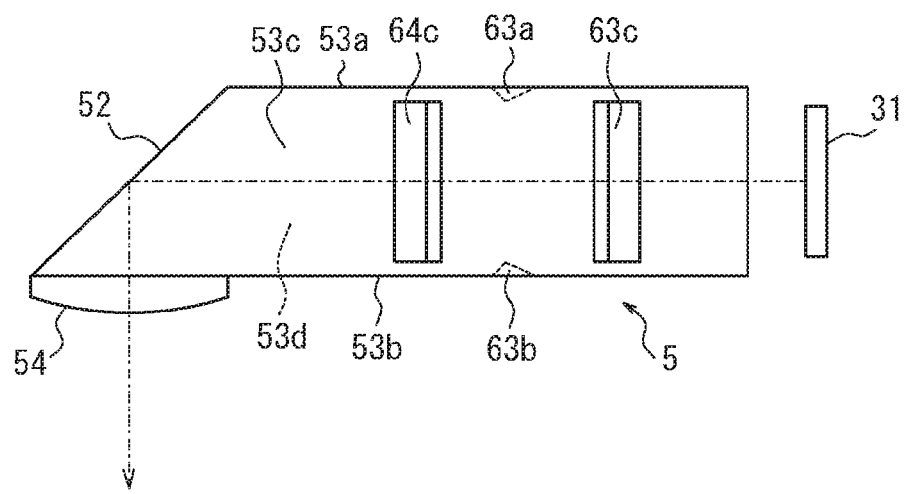
FIG. 7B is a plan view of the optical system in the image display apparatus of Embodiment 4.

FIGS. 7A and 7B illustrate the optical system in the image display apparatus of Embodiment 4. FIG. 7A is a front view as seen from the eye, and FIG. 7B is a plan view. In the light guide prism 5 of Embodiment 4, on the third side 53c and the fourth side 53d in the light guide prism 5 of Embodiment 3 in FIGS. 6A to 6C, additional prism grooves 64c and 64d (third pair of grooves) are formed at opposing positions on the reflecting surface 52 side of the prism grooves 63a and 63b. The prism grooves 63c and 63d on the entrance surface 51 side and the prism grooves 64c and 64d on the reflecting surface 52 side are formed by changing the angle of the groove faces forming the V-shape. Specifically, the prism grooves 63c and 63d are designed so as to cut stray light and ghost light due to image light from the display device 31, whereas the prism grooves 64c and 64d are designed to prevent inverse incident light that comes from the edges of the emission surface 54 or the reflecting surface 52 from reaching and affecting operation of the display device 31 or from lowering the contrast. In this case, the groove faces of the prism grooves 64c and 64d on the reflecting surface 52 side are inclined in the opposite direction from the groove faces of the prism grooves 63c and 63d on the entrance surface 51 side. In other words, as illustrated in FIG. 3, letting $\theta_1$ and $\theta_2$ be the angles of the faces corresponding to the groove face $S_1$ at the entrance surface side and the groove face $S_2$ at the reflecting surface side, the prism grooves 63c, 63d, 64c, and 64d are formed so that the magnitude relationship of $\theta_1$ and $\theta_2$ differs between the prism grooves 63c, 63d and the prism grooves 64c, 64d. With this approach, the inverse incident light can be cut. Since the remaining structure is similar to Embodiment 3, identical or corresponding constituent elements are labeled with the same reference signs, and a description thereof is omitted.

As described above, according to this embodiment, two pairs of prism grooves 63c, 63d and 64c, 64d are formed on the third and fourth sides 53c and 53d, and the prism grooves 64c, 64d are configured so as to cut inverse incident light. Therefore, in addition to the effects of Embodiment 3, an adverse effect on the operation of the display device and a reduction in contrast due to inverse incident light can be prevented.

The prism grooves 64c and 64d may be used for further removal of stray light and ghost light instead of for removal of inverse incident light. In this case, the depth of the prism grooves 63c, 63d, 64c, and 64d may be set to be less than in Embodiment 3 to produce similar effects as when only one pair of prism grooves 63c and 63d is formed. Additionally, a variety of effects may be obtained by providing a plurality of pairs of prism grooves and changing the angle of the groove faces in accordance with distance from the entrance surface 51.

Embodiment 5

Figure 8A:
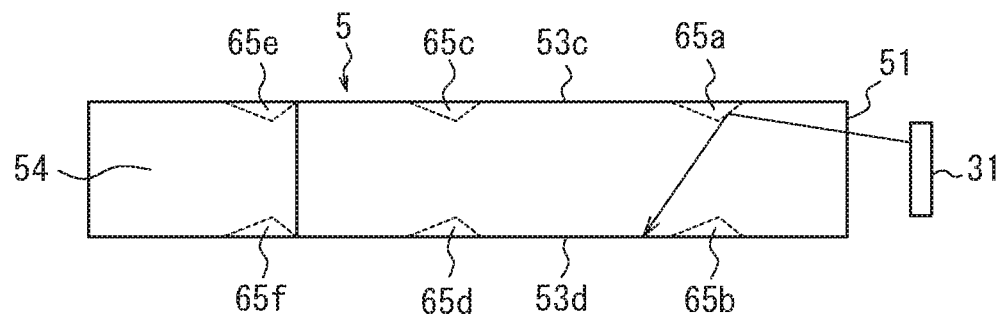
FIG. 8A is a front view of the optical system in an image display apparatus of Embodiment 5 as seen from the eye.
Figure 8B:
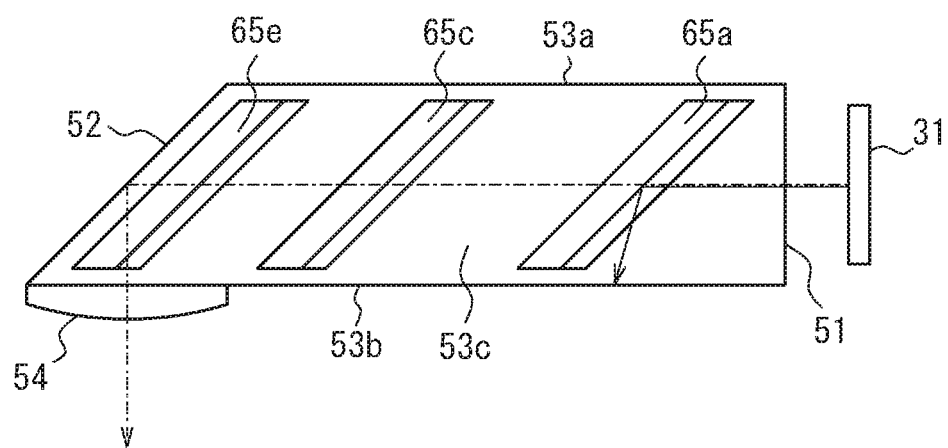
FIG. 8B is a plan view of the optical system in the image display apparatus of Embodiment 5.

FIGS. 8A and 8B illustrate the optical system in the image display apparatus of Embodiment 5. FIG. 8A is a front view as seen from the eye, and FIG. 8B is a plan view. In the light guide prism 5 of FIGS. 8A and 8B, three prism grooves 65a, 65c, and 65e are formed in this order from the entrance surface 51 on the third side 53c. These prism grooves 65a, 65c, and 65e are not formed to be perpendicular to the longitudinal direction of the light guide prism, but rather are formed at an angle. In particular, the prism groove 65e is provided near the reflecting surface 52, along the inclination of the reflecting surface. Similar prism grooves 65b, 65d, and 65f are also formed at positions on the fourth side 53d opposing the prism grooves 65a, 65c, and 65e.

With such a structure, light that strays from the optical path among the image light emitted from the display device 31 is deflected by the prism grooves 65a to 65f over a variety of directional components as viewed from the observer, such as the vertical direction, forwards and backwards, or the like, as in FIGS. 8A and 8B. In this way, ghost light can be cut more reliably. Since the prism grooves 65e and 65f are formed along the inclination of the reflecting surface 52 at a position near the reflecting surface 52, the circumferential portion of image light passes by the prism grooves 65e and 65f twice, before and after the reflecting surface 52. Hence, the effect of removing stray light and ghost light is doubled.

In addition to the prism grooves 65a to 65f provided on the third side 53c and the fourth side 53d, prism grooves that are perpendicular to the longitudinal direction or prism grooves at an angle with respect to the longitudinal direction may also be formed on the first side 53a and the second side 53b.

Embodiment 6

Figure 9:
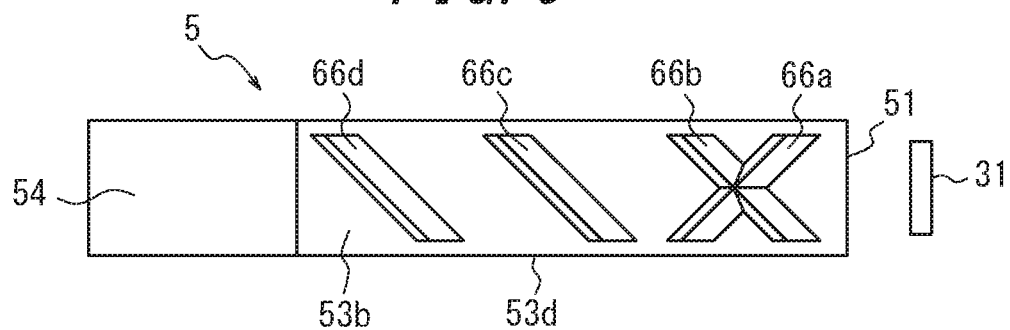
FIG. 9 is a front view of the optical system in an image display apparatus of Embodiment 6.

FIG. 9 is a front view of the optical system in an image display apparatus of Embodiment 6. In the light guide prism 5, prism grooves 66a to 66d at an angle with respect to the longitudinal direction are formed on the second side 53b. In this case, prism grooves are also formed on the first side 53a at corresponding positions but are omitted from FIG. 9 for the sake of simplicity. Among the prism grooves formed on the second side 53b, the prism grooves 66a and 66b intersect each other by being disposed at angles in opposite directions with respect to the longitudinal direction of the light guide prism 5. In this way, by having prism grooves disposed at angles in opposite directions intersect, the prism grooves 66a and 66b have a symmetrical shape with respect to the longitudinal direction of the light guide prism. As a result, stray light and ghost light can be cut evenly.

Embodiment 7

Figure 10:
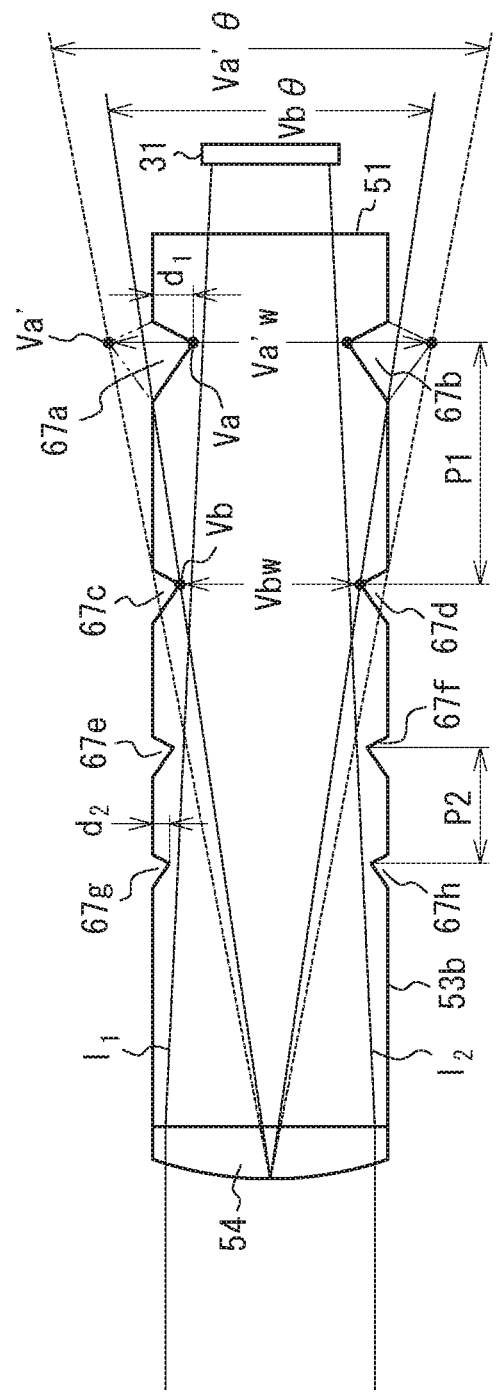
FIG. 10 illustrates the optical system in an image display apparatus of Embodiment 7.

FIG. 10 illustrates the optical system in an image display apparatus of Embodiment 7. Reflection by the reflecting surface 52 is omitted, and the light guide prism 53 is illustrated schematically by linear extension. On the first side 53a and the second side 53b, four pairs of prism grooves cutting across the sides 53a and 53b are formed at a right angle to the longitudinal direction of the light guide prism 5. Specifically, as illustrated in FIG. 10, pairs of prism grooves 67a, 67b, prism grooves 67c, 67d, prism grooves 67e, 67f, and prism grooves 67g, 67h are formed in order from the entrance surface 51.

In FIG. 10, among image light that is emitted from the display region of the display device 31 and passes through the emission surface 54, effective light flux passes through a range indicated as a region sandwiched by two lines $l_1$ and $l_2$. The prism grooves 67a to 67h are formed on the outside of the range through which the effective light flux passes. Accordingly, the prism grooves 67a to 67h are deeper with increased proximity to the entrance surface 51 and shallower with increased proximity to the reflecting surface 52. At the entrance surface 51 side, the prism grooves are deep, and therefore the prism grooves are disposed with a wide gap therebetween. At the reflecting surface 52 side, the prism grooves are shallow, and therefore the prism grooves are disposed with a narrow gap therebetween. In other words, in FIG. 10, $d_1 > d_2$, where $d_1$ is the depth of the prism grooves 67a and 67b, and $d_2$ is the depth of the prism grooves 67g and 67h. Furthermore, $P_1 > P_2$, where $P_1$ is the gap between the prism grooves 67a, 67b and the prism grooves 67c, 67d, and $P_2$ is the gap between the prism grooves 67e, 67f and the prism grooves 67g, 67h.

According to this embodiment with the above structure, the effective light flux of the image light emitted from the display device 31 is not obstructed by the prism grooves 67a to 67h. Also, as the prism grooves are deeper, the pitch between prism grooves is narrower. Hence, stray light and ghost light can be effectively removed.

Furthermore, the distance (P1) between grooves Va, Vb is set so that the relationship $$Vb\theta < Va'\theta$$

is satisfied, where in FIG. 10, Va represents the pair of grooves (prism grooves 67a, 67b) disposed at the side near the entrance surface 51, Vb represents another pair of grooves (prism grooves 67c, 67d) adjacent to these grooves on the emission surface 54 side, Vbθ represents the viewing angle defined by the width Vbw between the other pair of grooves Vb, Va' represents positions symmetrical, about the sides 53a, 53b on which the pair of grooves Va is formed, with the edges of the pair of grooves Va, Va'w represents the width between the positions Va', and Va' θ represents the viewing angle defined by the width Va'w. With this setting, ghost light occurring between the pair of grooves Va and the other pair of grooves Vb can be removed.

In this embodiment, a plurality of prism grooves similar to those on the first side and the second side may also be formed on the third side and the fourth side. In this case as well, similar effects are obtained by satisfying the above-described conditions on the depth of the grooves and the gap between grooves. The number of prism grooves on each side is not limited to four, and a larger number of prism grooves may be formed.

This disclosure is not limited to the above embodiments, and a variety of changes and modifications may be made. For example, in each of the above embodiments, an entrance surface orthogonal to the longitudinal direction of the light guide prism is provided on the end at the entrance side of the light guide prism, but the shape of the entrance side of the light guide prism is not limited to this case. FIGS. 11A and 11B are a modification to the light guide prism 5 in which the entrance-side end of the light guide prism in Embodiment 1 illustrated in FIGS. 2A to 2C is changed. In this light guide prism 5, a reflecting surface 71 inclined with respect to the longitudinal direction is also formed at the entrance-side end, an entrance surface 76 is formed at the end of the second side 53b nearer to the observer, and the display device 32 is disposed opposite the entrance surface 76. As a result, the image light emitted from the display device 32 enters the light guide prism 5 from the entrance surface 76, is reflected at the reflecting surface 71, and is guided through the light guide prism 5 in the longitudinal direction. Similar effects as in the above embodiments can also be obtained when configuring the entrance-side end in this way. The entrance-side end may also be configured in a variety of other ways.

In the above embodiments, the prism grooves formed on the first side and the second side of the light guide prism are disposed opposite each other, and similarly, the grooves formed on the third side and the fourth side are disposed opposite each other. This disclosure is not, however, limited in this way. For example, grooves may be disposed at different positions in the longitudinal direction on the four sides. Furthermore, the optical axis of the light guide prism need not lie along the longitudinal direction. For example, a configuration such that image light reflected a plurality of times on the first and second sides in the light guide prism is reflected at the reflecting surface and emitted from the emission surface may be adopted. In this case, the positions of the prism grooves on the first and second sides are set to be positions that do not block the optical path of effective image light.

The above-described light guide prism is configured with four sides, but this configuration is not limiting. For example, shapes yielded by chamfering or by rounding the edge between adjacent sides are included in this disclosure. The above-described light guide prism is formed from transparent resin, but the light guide prism may instead be formed from another transparent optical member, such as glass. Furthermore, in the above embodiments, the emission surface of the light guide prism is formed as a convex surface, but the emission surface need not be convex. For example, the reflecting surface may be formed to have a positive refractive power, with the emission surface being a flat surface. In this case as well, the observer can observe the image displayed on the display device as an enlarged virtual image.

The image display apparatus illustrated in FIG. 1 displays an image towards the observer's right eye but instead may be configured to display an image towards the left eye or towards both eyes. Furthermore, the image display apparatus is not limited to the shape of eyeglasses. The body and the light guide prism may be secured to the head in a variety of forms, for example by being secured to an object such as goggles or a helmet.

INDUSTRIAL APPLICABILITY

1 Image display apparatus
2 Support
3 Body
5 Light guide prism
31, 32 Display device
51 Entrance surface
52 Reflecting surface
53a First side
53b Second side
53c Third side
53d Fourth side
54 Emission surface
61a to 61d Prism groove
62a to 62d Prism groove
63a to 63d Prism groove
64c, 64d Prism groove
66a to 66d Prism groove
67a to 67h Prism groove
71 Reflecting surface

The invention claimed is:

1. A light guide prism for guiding image light from a display device to an observer's eye and displaying a virtual image of the display device in the observer's field of view, the light guide prism comprising:
at least four sides disposed to surround an optical path of image light incident from one end;
a reflecting surface configured to reflect the image light guided by the at least four sides; and
an emission surface configured to emit the image light reflected at the reflecting surface towards the observer's eye, wherein
at least one groove in a V-shape is formed on each of the at least four sides, and
the V-shape is defined by a first groove face and a second groove face, and inclination angles of the first groove face and the second groove face relative to a respective one of the at least four sides are configured so as to prevent unnecessary light occurring in the light guide prism to be guided to the observer's eye by transmitting the unnecessary light incident on one or more of the first groove face and second groove face to an exterior of the at least four sides or by reflecting the unnecessary light towards an interior of the at least four sides for subsequent transmission through at least one of the at least four sides;
wherein an intersection of the first and second groove faces defining a transmission area of intended light in a plane perpendicular to a longitudinal length of the at least four sides, light transmitted outside the transmission area but inside the at least four sides being unnecessary light.

2. The light guide prism of claim 1, wherein the at least one groove is formed to traverse the at least four sides and surround an optical path of the image light.

3. The light guide prism of claim 1, wherein the at least four sides are formed by two pairs of two opposing sides, the at least one groove includes a first pair of grooves and a second pair of grooves each formed at opposing positions on two opposing sides, and the first pair of grooves and the second pair of grooves are disposed at a distance from each other in a direction of travel of the image light.

4. The light guide prism of claim 3, further comprising a third pair of grooves, on the side on which the first pair of grooves is formed, at a different position in the direction of travel of the image light from the first pair of grooves, wherein an angle of an inclined face forming the V-shape of the first pair of grooves differs from an angle of an inclined face of the third pair of grooves.

5. An image display apparatus comprising:
a display device configured to emit image light;
a light guide prism configured to guide image light from the display device to an observer's eye and display a virtual image of the display device in the observer's field of view, the light guide prism comprising at least four sides disposed to surround an optical path of image light incident from one end, a reflecting surface configured to reflect the image light guided by the at least four sides, and an emission surface configured to emit the image light reflected at the reflecting surface towards the observer's eye, a groove in a V-shape being formed on each of the at least four sides; and
a support configured to support and secure the display device and the light guide prism to the observer's head;
wherein the V-shape is defined by a first groove face and a second groove face, and inclination angles of the first groove face and the second groove face relative to a respective one of the at least four sides are configured so as to prevent unnecessary light occurring in the light guide prism to be guided to the observer's eye by transmitting the unnecessary light incident on one or more of the first groove face and second groove face to an exterior of the at least four sides or by reflecting the unnecessary light towards an interior of the at least four sides for subsequent transmission through at least one of the at least four sides;

wherein an intersection of the first and second groove faces defining a transmission area of intended light in a plane perpendicular to a longitudinal length of the at least four sides, light transmitted outside the transmission area but inside the at least four sides being unnecessary light.

6. The image display apparatus of claim 5, wherein Dw<Vw<Pw, where Pw is a width of one side among the at least four sides, Vw is a length, in a direction of the width of the one side, of the groove formed on the one side, and Dw is a width of an effective region of the display device, in the direction of width of the one side.

7. The image display apparatus of claim 5, wherein D$\theta$<V$\theta$<P$\theta$, where D$\theta$ is a viewing angle of the display region of the display device, V$\theta$ is a viewing angle of a region formed by connecting edges of the V-shape of the grooves, and P$\theta$ is a viewing angle of an incident surface, through which the image light from the display device is incident, of the light guide prism.

8. A light guide prism for guiding image light from a display device to an observer's eye and displaying a virtual image of the display device in the observer's field of view, the light guide prism comprising:
at least four sides disposed to surround an optical path of image light incident from one end;
a reflecting surface configured to reflect the image light guided by the at least four sides; and
an emission surface configured to emit the image light reflected at the reflecting surface towards the observer's eye, wherein
an opposing pair of grooves in a V-shape is formed on at least one opposing pair of sides among the at least four sides;
wherein the V-shape is defined by a first groove face and a second groove face, and inclination angles of the first groove face and the second groove face relative to a respective one of the at least one pair of opposing sides are configured so as to prevent unnecessary light occurring in the light guide prism to be guided to the observer's eye by transmitting the unnecessary light incident on one or more of the first groove face and second groove face to an exterior of the at least four sides or by reflecting the unnecessary light towards an interior of the at least four sides for subsequent transmission through at least one of the at least four sides;
wherein an intersection of the first and second groove faces defining a transmission area of intended light in a plane perpendicular to a longitudinal length of the at least four sides, light transmitted outside the transmission area but inside the at least four sides being unnecessary light.

9. The light guide prism of claim 8, further comprising another pair of grooves in a V-shape, on the sides on which the pair of grooves in a V-shape is formed, towards the emission surface from the pair of grooves in a V-shape in a direction of travel of the image light, wherein Vb$\theta$<Va'$\theta$, where Va'$\theta$ is a viewing angle defined by a width between positions symmetrical, about the sides on which the pair of grooves in a V-shape is formed, with edges of the pair of grooves in a V-shape, and Vb$\theta$ is a viewing angle defined by a width between the other pair of grooves in a V-shape.

10. An image display apparatus comprising:
a display device configured to emit image light;
a light guide prism configured to guide image light from the display device to an observer's eye and display a virtual image of the display device in the observer's field of view, the light guide prism comprising at least four sides disposed to surround an optical path of image light incident from one end, a reflecting surface configured to reflect the image light guided by the at least four sides, and an emission surface configured to emit the image light reflected at the reflecting surface towards the observer's eye, an opposing pair of grooves in a V-shape being formed on at least one opposing pair of sides among the at least four sides; and
a support configured to support and secure the display device and the light guide prism to the observer's head;
wherein the V-shape is defined by a first groove face and a second groove face, and inclination angles of the first groove face and the second groove face relative to a respective one of the at least one pair of opposing sides are configured so as to prevent unnecessary light occurring in the light guide prism to be guided to the observer's eye by transmitting the unnecessary light incident on one or more of the first groove face and second groove face to an exterior of the at least four sides or by reflecting the unnecessary light towards an interior of the at least four sides for subsequent transmission through at least one of the at least four sides;
wherein an intersection of the first and second groove faces defining a transmission area of intended light in a plane perpendicular to a longitudinal length of the at least four sides, light transmitted outside the transmission area but inside the at least four sides being unnecessary light.

* * * * *